United States Patent
Fukuyama et al.

(10) Patent No.: US 8,244,900 B2
(45) Date of Patent: Aug. 14, 2012

(54) MEASURING METHOD, MEASURING APPARATUS AND COMPUTER PROGRAM

(75) Inventors: Noriyuki Fukuyama, Kawasaki (JP); Masanobu Morinaga, Kawasaki (JP); Hideaki Miyazaki, Kawasaki (JP); Sumiyo Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 327 days.

(21) Appl. No.: 12/561,410

(22) Filed: Sep. 17, 2009

(65) Prior Publication Data

US 2010/0008249 A1   Jan. 14, 2010

Related U.S. Application Data

(63) Continuation of application No. PCT/JP2007/055763, filed on Mar. 20, 2007.

(51) Int. Cl.
*G06F 15/16* (2006.01)
*G06F 15/173* (2006.01)

(52) U.S. Cl. .................. 709/231; 709/223; 709/224

(58) Field of Classification Search .................. 370/235, 370/253, 401; 709/223, 224, 231
See application file for complete search history.

(56) References Cited

U.S. PATENT DOCUMENTS

| 7,492,720 | B2 | 2/2009 | Pruthi et al. |
| 2002/0105911 | A1 | 8/2002 | Pruthi et al. |
| 2007/0127509 | A1* | 6/2007 | Lin .............................. 370/401 |
| 2008/0232250 | A1* | 9/2008 | Park .............................. 370/235 |
| 2009/0116402 | A1* | 5/2009 | Yamasaki ................... 370/253 |

FOREIGN PATENT DOCUMENTS

| JP | 2002-531014 A | 9/2002 |
| JP | 2005-159807 A | 6/2005 |
| JP | 2005-328131 A | 11/2005 |
| JP | 2005-348015 A | 12/2005 |
| JP | 2006-013969 A | 1/2006 |
| JP | 2006-033554 A | 2/2006 |
| WO | 00-31963 A1 | 6/2000 |
| WO | 2007-010763 A1 | 1/2007 |

OTHER PUBLICATIONS

International Search Report for PCT/JP2007/055763, mailing date of Jun. 19, 2007.
Japanese Office Action dated Mar. 15, 2011, issued in corresponding Japanese Patent Application 2009-505049.

* cited by examiner

*Primary Examiner* — Quang N. Nguyen
(74) *Attorney, Agent, or Firm* — Fujitsu Patent Center

(57) ABSTRACT

There is provided a measuring apparatus for acquiring packets being transmitted and received within a packet network and measuring communication quality on the basis of the acquired packets, the apparatus including a part that extracts packets acquired within one of given sampling periods, each sampling period set intermittently, and a part that measures communication quality on the basis of the packets acquired within the sampling period.

11 Claims, 13 Drawing Sheets

F I G. 6
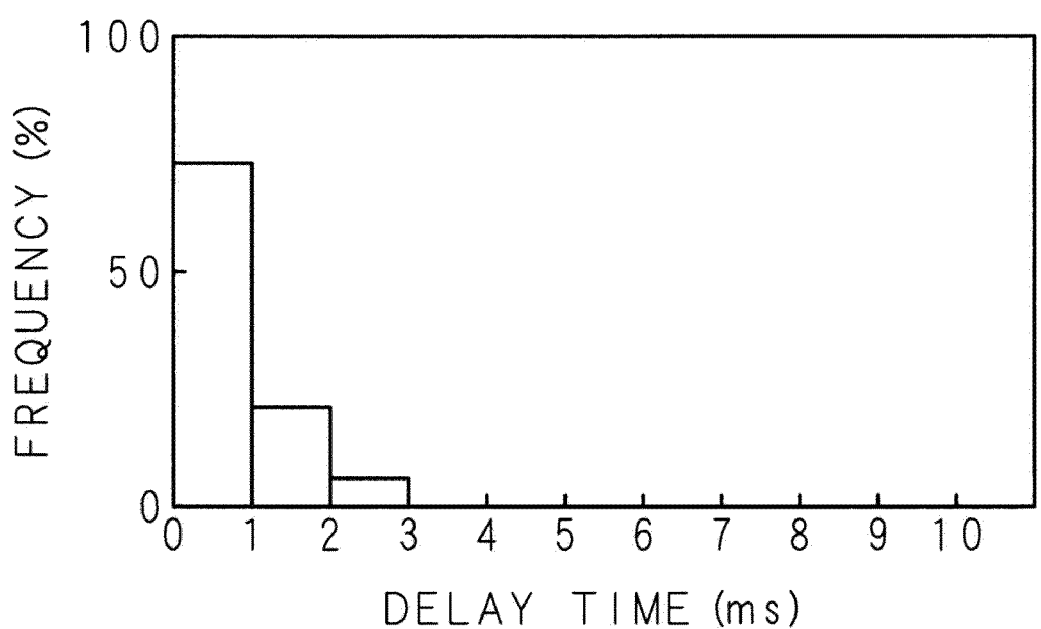

MEASURING METHOD, MEASURING APPARATUS AND COMPUTER PROGRAM

This application is a continuation, filed under 35 U.S.C. §111(a), of PCT International Application No. PCT/JP2007/055763 which has an international filing date of Mar. 20, 2007, and designated the United States of America.

FIELD

The invention relates to a measuring method for acquiring packets transmitted and received within a packet network to measure communication quality on the basis of the acquired packets, a measuring apparatus to which the measuring method is applied, and a computer program for achieving the measuring apparatus, and relates particularly to a measuring method, a measuring apparatus, and a computer program for reducing a processing load required for the measurement of the communication quality.

BACKGROUND

Communication systems, such as an IP phone and the like using a packet network, such as a Voice over Internet Protocol (VoIP) network or the like have become widespread. In order to manage communication quality in the packet network, such as the VoIP network or the like, a method in which a communication quality value, such as a loss rate of packets transmitted and received in the packet network or the like is measured, the measured communication quality value is compared with a management reference value that the network administrator has set previously to thereby detect a communication state, and thus the packet network is monitored has been carried out (for example, refer to Japanese Laid-Open Patent Publication No. 2005-159807: Patent Document 1).

SUMMARY

According to the method disclosed in Patent Document 1, however, all the packets are acquired and the communication quality is measured on the basis of the acquired all the packets, thus causing a problem related to a processing load that a workload required for the measurement of the communication quality increases with an increase in packet amount.

The invention has been made in view of the situation described above, and it is a main object to provide a measuring method for measuring communication quality on the basis of packets acquired within a given sampling period set intermittently to thereby reduce a processing load, a measuring apparatus to which the measuring method is applied, and a computer program for achieving the measuring apparatus.

It is another object of the invention to provide a measuring apparatus or the like which counts lost packets on the basis of a time until acquiring a packet first and a time after acquiring a packet lastly to thereby allow the communication quality to be measured accurately while taking delay jitter of the packet into consideration.

It is still another object of the invention to provide a measuring apparatus or the like which adds a continuing situation of a session upon counting the lost packets to thereby allow the communication quality to be measured accurately.

There provided a measuring method in accordance with an aspect, for acquiring transmitted and received packets, in which a session, a sequence within the session, and a transmission interval are indicated, from a packet network to measure communication quality on the basis of the obtained packets, wherein the measuring method extracts packets acquired within a given sampling period set intermittently; counts the packets acquired within the sampling period; on the basis of the transmission interval of the packet, a time after a sampling start time until acquiring the packet first, and a given margin time, counts the number of packets which should have been acquired before a packet acquired first within the sampling period as a first number of lost packets; on the basis of the transmission interval of the packet, a time after acquiring the packet lastly until the sampling end time, and the given margin time, counts the number of packets which should have been acquired after a packet acquired lastly within the sampling period as a second number of lost packets; on the basis of the sequence indicated in the packet acquired first and the sequence indicated in the packet acquired lastly, and the number of acquired packets, counts the number of packets which have not been able to be acquired between acquiring the packet first and acquiring the packet lastly within the sampling period as a third number of lost packets; and calculates a loss rate of packets on the basis of the number of acquired packets, and the first number of lost packets, the second number of lost packets, and the third number of lost packets.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a histogram illustrating one example of a distribution of delay time jitters used for setting a margin time in the measuring method according to the embodiment;

DESCRIPTION OF EMBODIMENTS

Hereinafter, one embodiment will be described in full detail based on the drawings.

Figure 1:
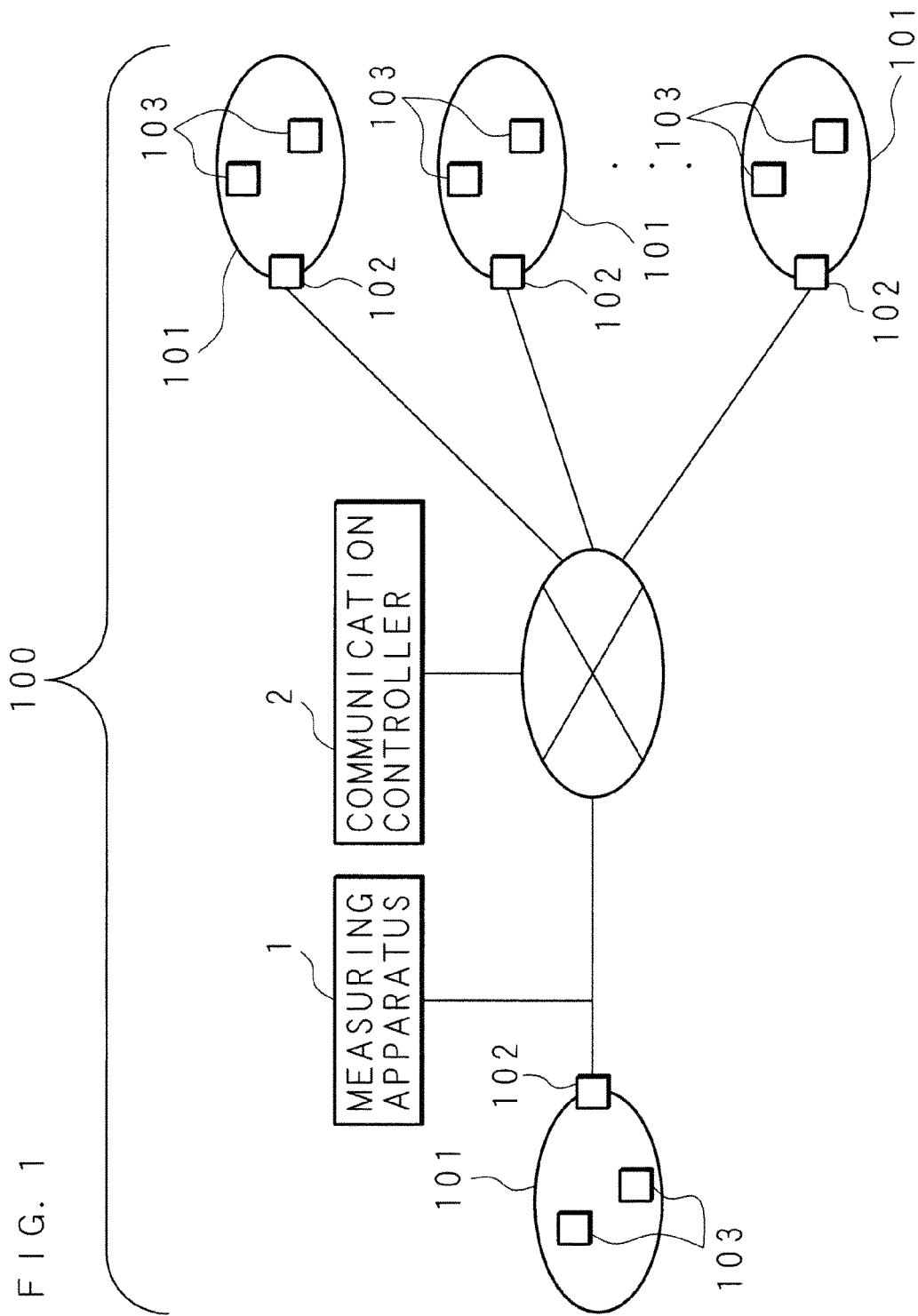
FIG. 1 is an explanatory view conceptually illustrating one example of a configuration of a measuring method according to one embodiment.

FIG. 1 is an explanatory view conceptually illustrating a configuration example of a measuring method according to the embodiment. In FIG. 1, reference numeral 100 is a packet network, such as a WAN, a Voice over Internet Protocol (VoIP) network, the Internet, or the like, wherein a plurality of sites 101, 101, . . . which are classified as segments are connected via the packet network 100, internetworking devices 102, such as a router, a gateway, or the like are arranged at the sites 101, 101, . . . , respectively, and one or a plurality of communication apparatuses 103, 103, . . . , such as various computers or the like are connected via the internetworking devices 102.

One communication apparatus 103 may transmit and receive packets including streaming data for reproducing an image and/or a voice by establishing a session with other communication apparatus 103, and perform communications through a means of a videophone and the like. It is to be noted that information for specifying the session, and information related to the communication, such as a sequence number for indicating a sequence within the session, a transmission interval, a codec type capable of deriving the transmission interval, and the like are indicated in the packet as header information.

In addition, a measuring apparatus 1 according to the embodiment, which acquires packets transmitted and received between the communication apparatuses 103 and 103 that have established the session, and measures communication quality, such as a loss rate of packets on the basis of the acquired packets, is connected to the packet network 100. It is to be noted that the internetworking device 102 or the communication apparatus 103 may also be used as the measuring apparatus 1.

Further, a communication controller 2 using a Session Initiation Protocol (SIP) server computer that controls the session is connected to the packet network 100, and streaming communications between the communication apparatuses 103 and 103 are managed by control of the communication controller 2 on the basis of a protocol, such as SIP and the like. Acquiring signaling packets used for setting the session between the communication apparatuses 103 and 103 then allows the measuring apparatus 1 to detect a start and an end of the session between the communication apparatuses 103 and 103.

Figure 2:
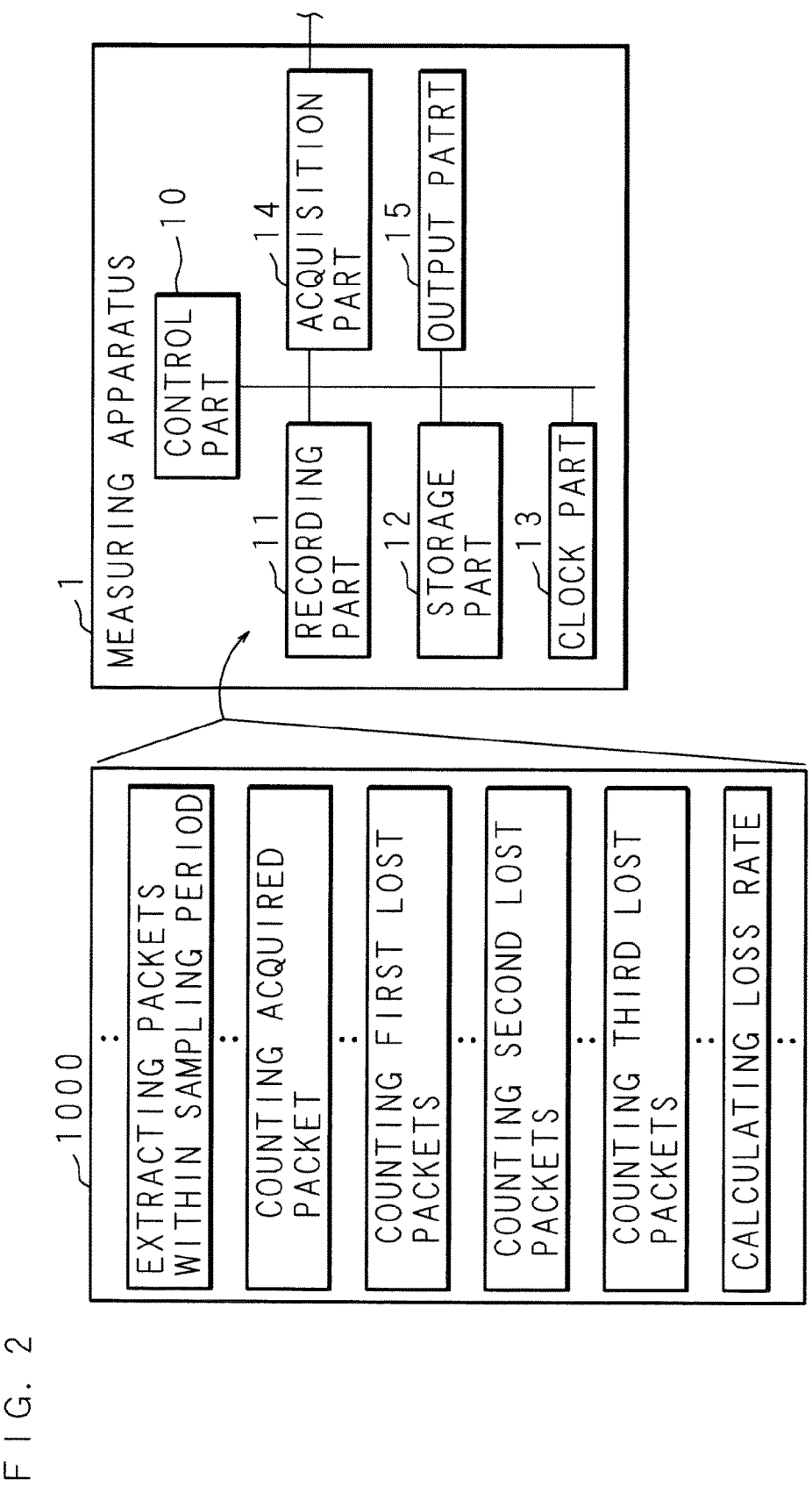
FIG. 2 is a block diagram illustrating one example of a configuration of a measuring apparatus according to the embodiment.

FIG. 2 is a block diagram illustrating a configuration example of the measuring apparatus 1 according to the embodiment. The measuring apparatus 1 is provided with a control unit 10, such as a CPU or the like for controlling the whole apparatus, a recording unit 11, such as a hard disk or the like for recording a variety of information, such as a computer program 1000 of the embodiment, data, and the like thereon, a storage unit 12, such as a RAM or the like for temporarily storing a variety of information therein, a clock unit 13 operating as a clock and a timer, an acquisition unit 14 for acquiring the packets transmitted and received over the packet network 100, and an output unit 15, such as a monitor, a printer, and the like. The computer program 1000 recorded on the recording unit 11 is then stored in the storage unit 12 to be executed by control of the control unit 10, and thereby the measuring apparatus 1 operates as the measuring apparatus 1 according to the embodiment.

Figure 3:
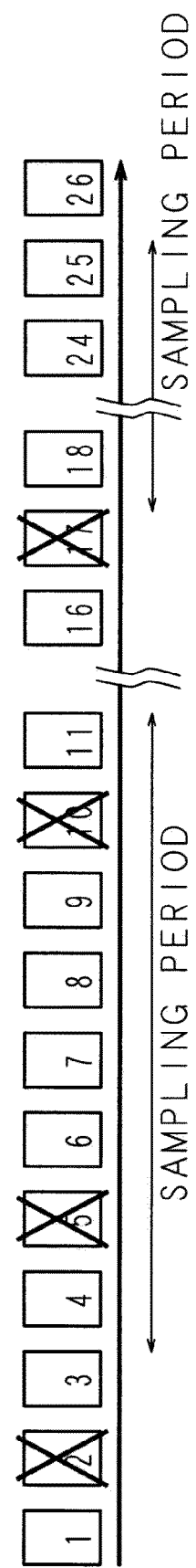
FIG. 3 is an explanatory view illustrating one example of a first processing by the measuring apparatus according to the embodiment.

Next, various processings of the measuring apparatus 1 according to the embodiment will be described. FIG. 3 is an explanatory view conceptually illustrating one example of a first processing by the measuring apparatus 1 according to the embodiment. The measuring apparatus 1 according to the embodiment measures the communication quality on the basis of the packets acquired within a given sampling period which is set intermittently with a given interval. Here, data for setting the sampling interval and the sampling period is previously recorded on the recording unit 11 of the measuring apparatus 1. The packets acquired by the measuring apparatus 1 are illustrated in time series in FIG. 3, wherein a quadrangle represents a packet, and a numeric character(s) represented in the quadrangle represents a sequence number, while a quadrangle on which x mark is marked represents a lost packet which has not been able to be acquired. Meanwhile, a two-headed arrow in FIG. 3 represents a sampling period. In the first processing, the loss rate of packets is calculated as the measurement of the communication quality on the basis of the number of acquired packets in the packets that the measuring apparatus 1 should acquire within the sampling period, and the number of packets which have not been able to be acquired between the packet acquired first and the packet acquired lastly within the sampling period.

Figure 4:
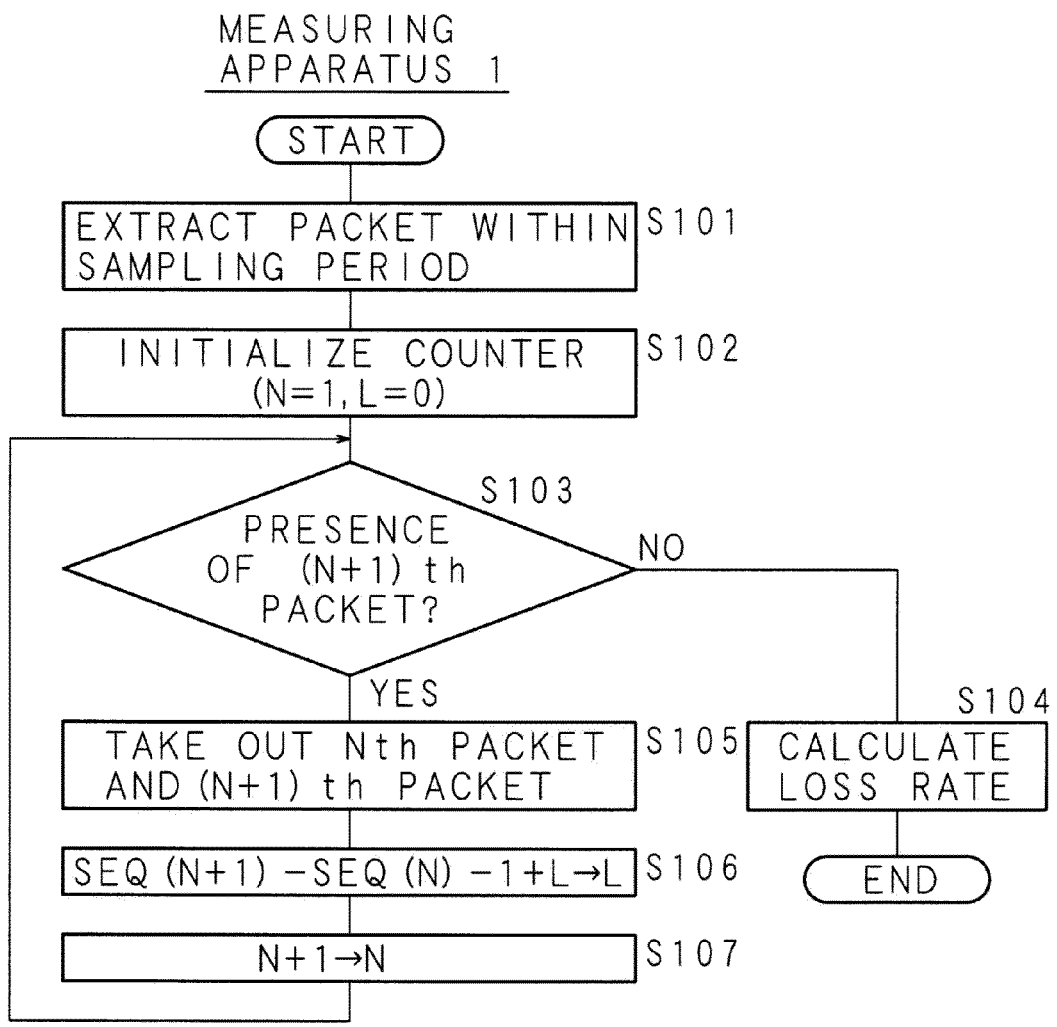
FIG. 4 is an operation chart illustrating one example of the first processing by the measuring apparatus according to the embodiment.

FIG. 4 is an operation chart illustrating one example of the first processing by the measuring apparatus 1 according to the embodiment. The measuring apparatus 1 acquires a packet transferred over the packet network 100 in the acquisition unit 14, gives time information which indicates an acquisition time on the basis of the clock unit 13 to the acquired packet, and stores it in the storage unit 12 (or recording unit 11) used as a buffer memory. The measuring apparatus 1 then extracts a packet whose acquisition time is within the given sampling period in the acquired packets stored in the storage unit 12, by the control of the control unit 10 which executes the computer program 1000 (S101). The packets extracted at Step S101 are packets related to the session used as an object of the measurement. It is to be noted that although the packets are acquired only within the sampling period and the acquired packets are extracted as the object of the measurement here, all the packets to be transferred may be acquired and the packets acquired within the sampling period in the acquired packets may be extracted. Incidentally, the first processing will be completed if there is not packet to be extracted, namely if the packet used as the object of the measurement is not acquired within the sampling period.

By the control of the control unit 10, the measuring apparatus 1 rearranges the extracted packets in ascending order on the basis of the acquisition time, and initializes counters which are set to a register of the control unit 10, or the storage unit 12 (S102). The counters at Step S102 are a packet counter and a lost packet counter, and the packet counter is set to N=1 and the lost packet counter is set to L=0 by the initialization processing.

The measuring apparatus 1 determines the presence/absence of an (N+1)th packet, by the control of the control unit 10 (S103). At the first step, the (N+1)th packet is a second acquired packet within the sampling period.

If it is determined at Step S103 that there is no (N+1)th packet (S103: NO), the measuring apparatus 1 calculates the loss rate of packets on the basis of the number of acquired packets that the packet counter N indicates and the number of lost packets that the lost packet counter L indicates, by the control of the control unit 10 (S104), and the first processing will be completed. The loss rate of packets calculated as a measurement result of the communication quality is calculated as a value represented by percentage, where the value is obtained by dividing the number of lost packets by the sum of the number of acquired packets and the number of lost packets.

If it is determined at Step S103 that there is the (N+1)th packet (S103: YES), the measuring apparatus 1 takes out an Nth packet and the (N+1)th packet, by the control of the control unit 10 (S105), and adds to the lost packet counter L a value which is obtained by further subtracting 1 from a value obtained by subtracting the sequence number of the Nth packet from the sequence number of the (N+1)th packet (S106). Although a mode in which the sequence number included in the packet increases by 1 for every successive packet is described here, the embodiment is not limited to this, but may be expanded to a mode in which the sequence number increases by the increment other than 1, and in that case, processing of converting it into a number where the sequence number increases by 1 will be executed. For example, if the sequence number increases by 2, a function SEQ converts it into a successive sequence number by dividing the sequence number included in the received packet by 2, and adjusts a difference between the sequence numbers after conversion to be the number of packets lost between the Nth packet and the (N+1)th packet.

The measuring apparatus 1 then adds 1 to the packet counter N by the control of the control unit 10 (S107), returns to Step S103, and repeats the subsequent processing. In this way, the packet counter N counts the number of acquired packets within the sampling period, while the lost packet counter L counts the number of packets which have not been able to be acquired between acquiring the packet first and acquiring the packet lastly within the sampling period, namely, the number of lost packets. The measurement of the communication quality on the basis of the counted result, for example, the calculation of the loss rate will be then performed.

Figure 5:
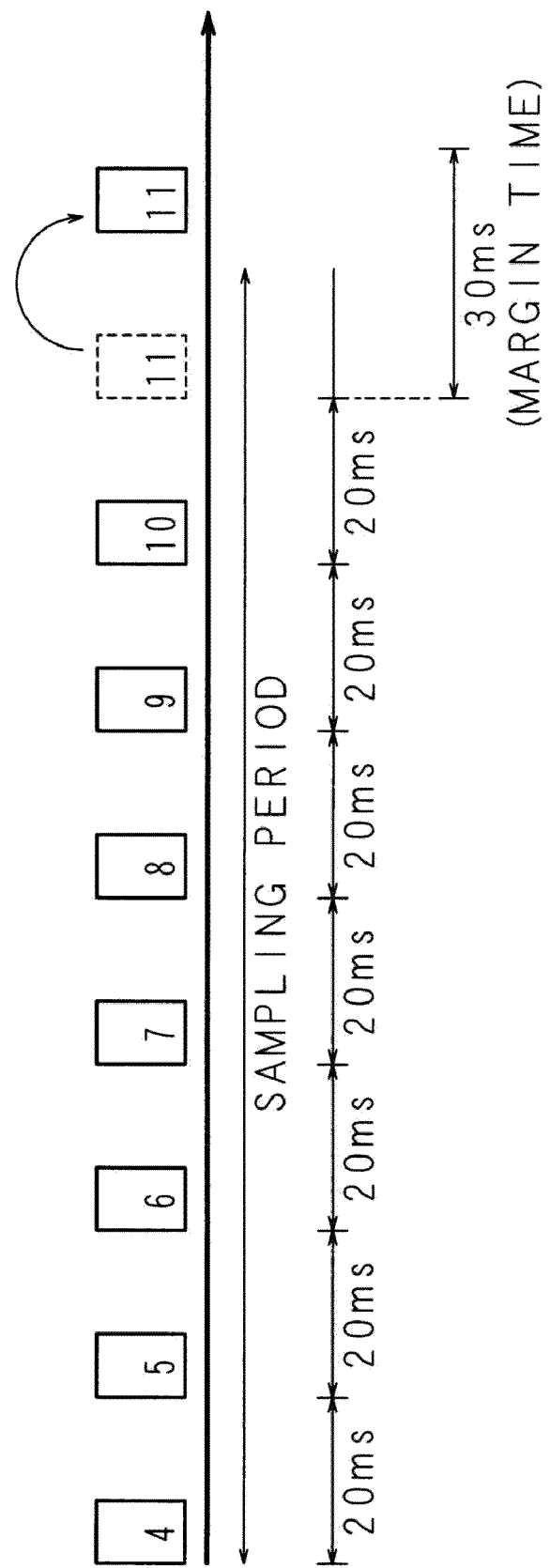
FIG. 5 is an explanatory view illustrating one example of a second processing by the measuring apparatus according to the embodiment.

FIG. 5 is an explanatory view conceptually illustrating one example of a second processing by the measuring apparatus 1 according to the embodiment. The second processing is a mode of measuring the communication quality, after taking into consideration the packets which should have been acquired until acquiring the packet first within the sampling period, and the packets which should have been acquired after acquiring the packet lastly in the first processing. Incidentally, the notation in FIG. 5 is similar to that in FIG. 3. FIG. 5 illustrates an example where the transmission interval of the packet is 20 milliseconds. If the time after acquiring the packet lastly within the sampling period is 20 milliseconds or more, which is the transmission interval, it is considered that the packet, which should have been acquired after the packet acquired lastly, indicated by a dotted line in the figure, may have been lost. However, it is also considered that arrival of the packet may only be delayed compared with other packet due to delay jitter of the packet. Hence, in the second processing, a time of, for example, 30 milliseconds is set as a margin time which is assumed to be the maximum value of the delay jitter, wherein it is determined that the packet has not arrived from the original time when the packet should arrive (be acquired) until the margin time elapses due to the delay jitter, while if a time of the margin time or more has elapsed from an original arrival time, it is determined that the packet has been lost. Similarly, if a time until acquiring the packet first is 20 milliseconds or more within the sampling period, it is considered that the packet which should have been acquired before a packet acquired first may have been lost, and it is determined whether or not the packet has been lost in consideration of the margin time.

A method of deriving the margin time to be set includes several methods. For example, a first method is a method of setting the margin time on the basis of a reproducing time of the streaming data corresponding to a memory size of the buffer memory for jitter absorption secured in the communication apparatus 103 on the reception-side. For example, if the transmission interval of the packet is 20 milliseconds, the streaming data for reproducing the image and/or the voice for 20 milliseconds shall be included in one packet. Accordingly, if the buffer memory secured in the communication apparatus 103 on the reception-side has a capacity of storing the streaming data for 50 milliseconds, the margin time will be set as 30 milliseconds. If the delay which is equal to a time for the data accumulated in the buffer memory or more, the margin time thus set causes reproduction interference, such as interruption of voice sound or the like, thus allowing the communication quality reflecting an actual operating state to be measured.

For example, a second method is a method of setting the margin time on the basis of the actual result value of the delay jitter. FIG. 6 is a histogram illustrating a distribution example of the delay time jitters used for setting the margin time in the measuring method according to the embodiment. FIG. 6 illustrates a frequency distribution for every delay time from the arrival time. In the example illustrated in FIG. 6, 73% of the packets have a delay time within 1 millisecond, 94% thereof have a delay time within 2 milliseconds, and 100% thereof have a delay time within 3 milliseconds. As a result, when a time corresponding to, for example, 90% of the delay time distribution is set as the margin time, 2 milliseconds shall be set as the margin time from the actual result illustrated in FIG. 6. It is to be noted that the margin time is set on the basis of the actual result value between the same sites 101, 101 as between the sites 101, 101 used as the object of the measurement of the communication quality. The margin time thus set allows the communication quality capable of indicating the statistical reliability to be measured.

Figure 7:
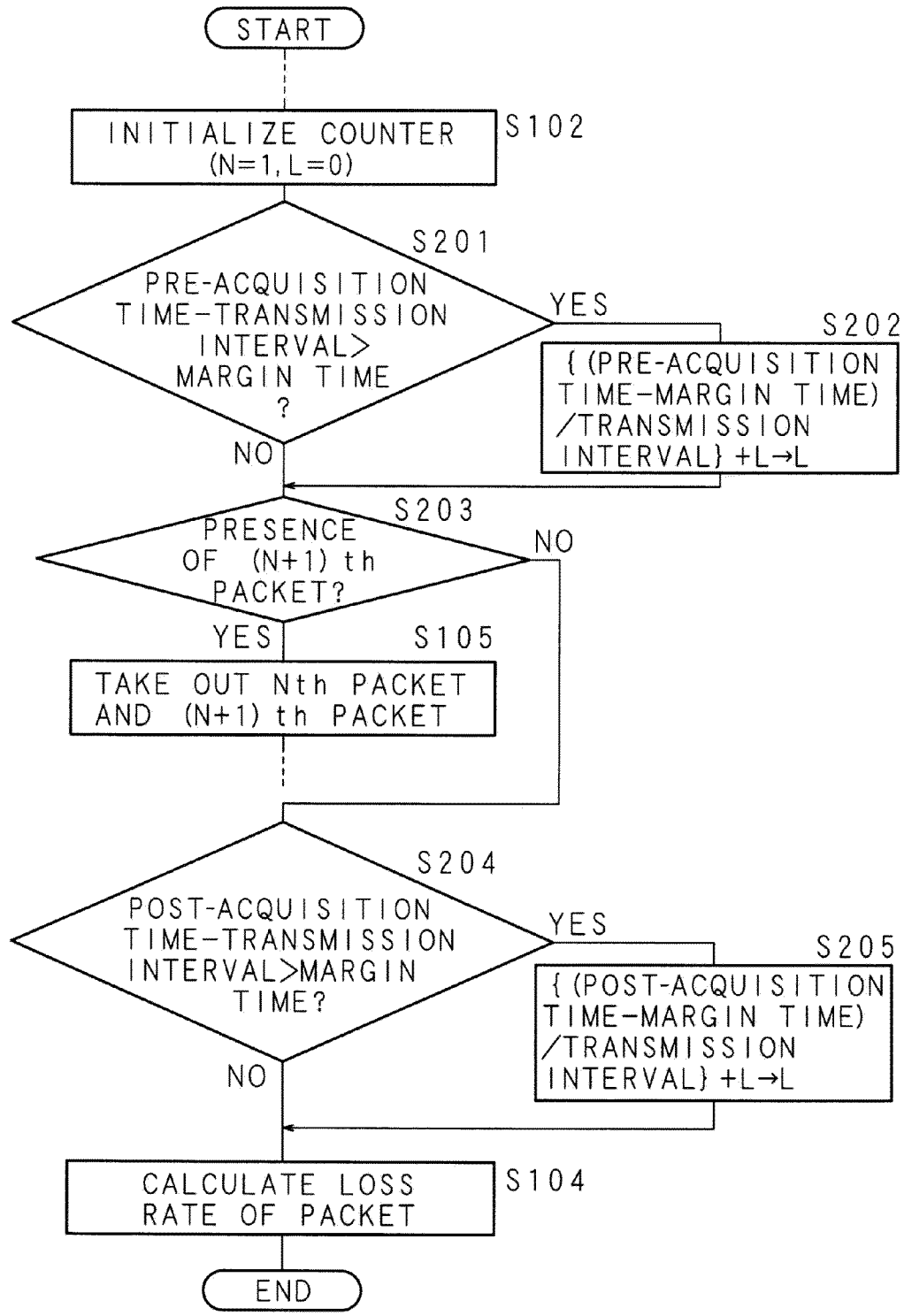
FIG. 7 is an operation chart illustrating one example of the second processing by the measuring apparatus according to the embodiment.

FIG. 7 is an operation chart illustrating one example of the second processing by the measuring apparatus 1 according to the embodiment. Since the processing upon start in the second processing is similar to Steps S101 and S102 in the first processing, the first processing shall be referred to, and description thereof will be omitted. The measuring apparatus 1 initializes the counter by the control of the control unit 10 which executes the computer program 1000, and then determines whether or not a time obtained by subtracting the transmission interval of the packet from a pre-acquisition time after the sampling start time until acquiring the packet first is longer than the given margin time (S201). Step S201 is processing to determine whether or not the packet is lost by determining whether or not the pre-acquisition time generates the delay jitter equal to the margin time or more from the original arrival time on the basis of the transmission interval, as described using FIG. 5.

If it is determined at Step S201 that the time obtained by subtracting the transmission interval from the pre-acquisition time is longer than the margin time (S201: YES), the measuring apparatus 1 adds to the lost packet counter L a value of a quotient calculated by dividing the time obtained by subtracting the given margin time from the pre-acquisition time by the transmission interval of the packet, by the control of the control unit 10 (S202). If the quotient calculated at Step S202 is not an integer, a numerical value after the decimal point is rounded down to an integer. Step S202 is processing of counting the number of lost packets on the basis of the quotient obtained by dividing the time obtained by subtracting the given margin time from the pre-acquisition time by the transmission interval of the packet.

If it is determined at Step S201 that the time obtained by subtracting the transmission interval from the pre-acquisition time is shorter than the margin time (S201: NO), it is determined that there is no lost packets before acquiring the packet first within the sampling period, so that the processing at Step S202 will not be performed.

The measuring apparatus 1 subsequently determines the presence/absence of the (N+1)th packet by the control of the control unit 10 (S203). Processing at Step S203 is processing similar to that at Step S103 in the first processing.

If it is determined at Step S203 that there is no (N+1)th packet (S203: NO), the measuring apparatus 1 determines whether or not a time obtained by subtracting the transmission interval of the packet from a post-acquisition time after acquiring the packet lastly until a sampling end time is longer than the given margin time, by the control of the control unit 10 (S204). Step S204 is processing to determine whether or not the packet is lost by determining whether or not the post-acquisition time generates the delay jitter equal to the margin time or more from the original arrival time on the basis of the transmission interval, as described using FIG. 5.

If it is determined at Step S204 that the time obtained by subtracting the transmission interval from the post-acquisition time is longer than the margin time (S204: YES), the measuring apparatus 1 adds to the lost packet counter L a value of a quotient calculated by dividing the time obtained by subtracting the given margin time from the post-acquisition time by the transmission interval of the packet, by the control of the control unit 10 (S205). If the quotient calculated at Step S205 is not an integer, a numerical value after the decimal point is rounded down to an integer. Step S205 is processing of counting the number of lost packets on the basis of the quotient obtained by dividing the time obtained by subtracting the given margin time from the post-acquisition time by the transmission interval of the packet.

If it is determined at Step S204 that the time obtained by subtracting the transmission interval from the post-acquisition time is shorter than the margin time (S204: NO), it is determined that there is no lost packets after acquiring the packet lastly within the sampling period, so that the processing at Step S205 will not be performed.

The measuring apparatus 1 then executes the processing after Step S104 in the first processing.

If it is determined at Step S203 that there is the (N+1)th packet (S203: YES), the measuring apparatus 1 executes the processing after Step S105 in the first processing by the control of the control unit 10.

When the second processing is incorporated in the first processing, the number of lost packets that the lost packet counter L indicates becomes a sum of the number of lost packets which should have been acquired between the sampling start time and acquiring the packet first, the number of lost packets which should have been acquired between acquiring the packet lastly and the sampling end time, and the number of lost packets between acquiring the packet first and acquiring the packet lastly.

Figure 8:
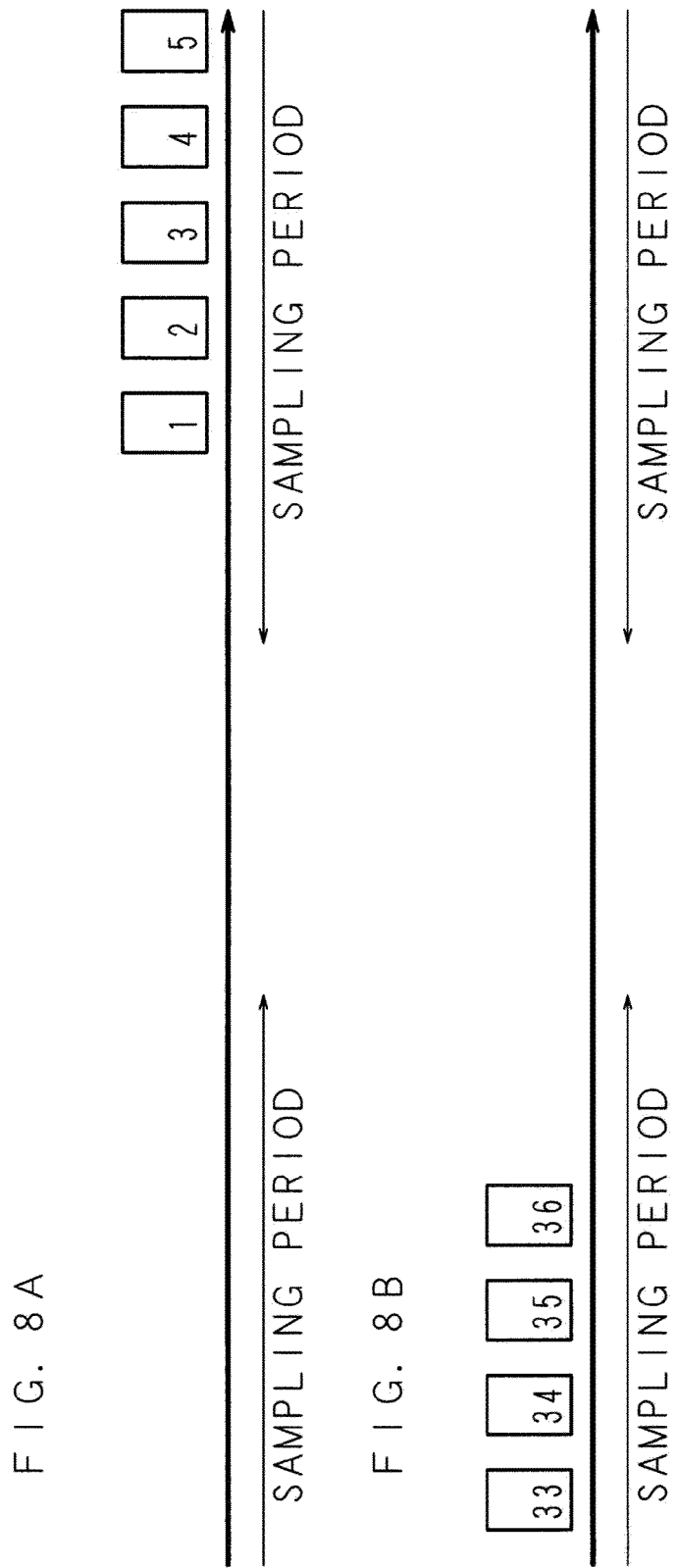
FIG. 8A and FIG. 8B are explanatory views conceptually illustrating one example of a third processing by the measuring apparatus according to the embodiment.

FIG. 8A and FIG. 8B are explanatory views conceptually illustrating one example of a third processing by the measuring apparatus 1 according to the embodiment. The third processing is processing when the session is started or completed during the sampling period in the first processing and the second processing. Incidentally, the notation in FIG. 8A and FIG. 8B is similar to that in FIG. 3 and FIG. 5. FIG. 8A illustrates this sampling period used as the object of the measurement of the communication quality, and the last sampling period. In the third processing, it is determined whether or not the packet related to the same session as the session related to the packet acquired within this sampling period is acquired within the last sampling period. If it is determined that the packet related to the same session is not acquired, it is determined that the packet acquired first within this sampling period may be the packet received first after establishing the session. Accordingly, if it is determined that the packet related to the same session is not acquired within the last sampling period, it is determined that there is no lost packets during a time until acquiring the packet first, regardless of the time until acquiring the packet first after this sampling start time.

FIG. 8B illustrates this sampling period used as the object of the measurement of the communication quality, and the next sampling period just after this sampling period. In the third processing, it is determined whether or not the packet related to the same session as the session related to the packet acquired within this sampling period is acquired within the next sampling period. If it is determined that the packet related to the same session is not acquired, it is determined that the session may be completed immediately after acquiring the packet lastly within this sampling period. Accordingly, if it is determined that the packet related to the same session is not acquired within the next sampling period, it is determined that there is no lost packets during a time after acquiring the packet lastly, regardless of the time until this sampling end time after acquiring the packet lastly.

Figure 9:
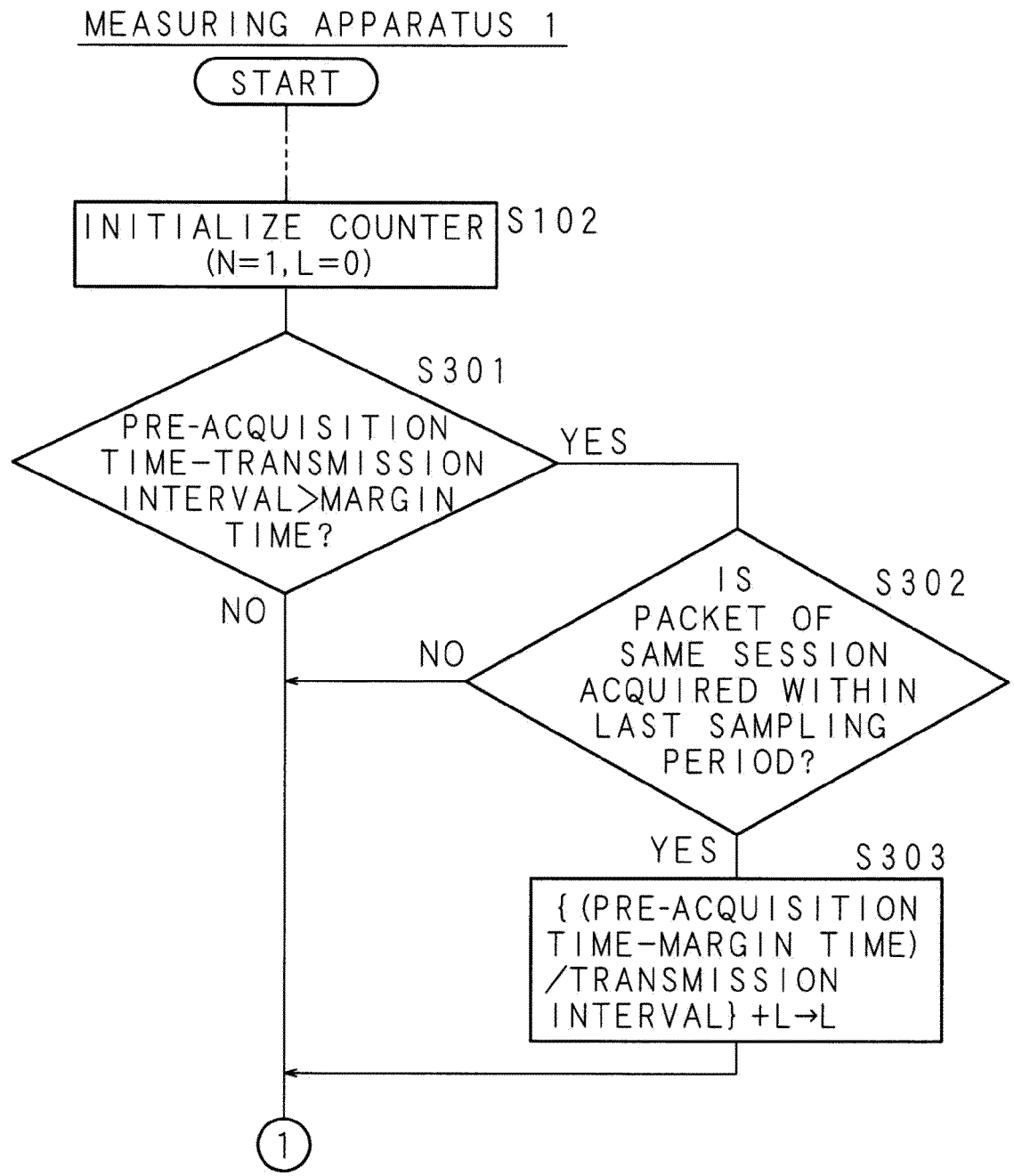
FIG. 9 is an operation chart illustrating one example of the third processing by the measuring apparatus according to the embodiment.
Figure 10:
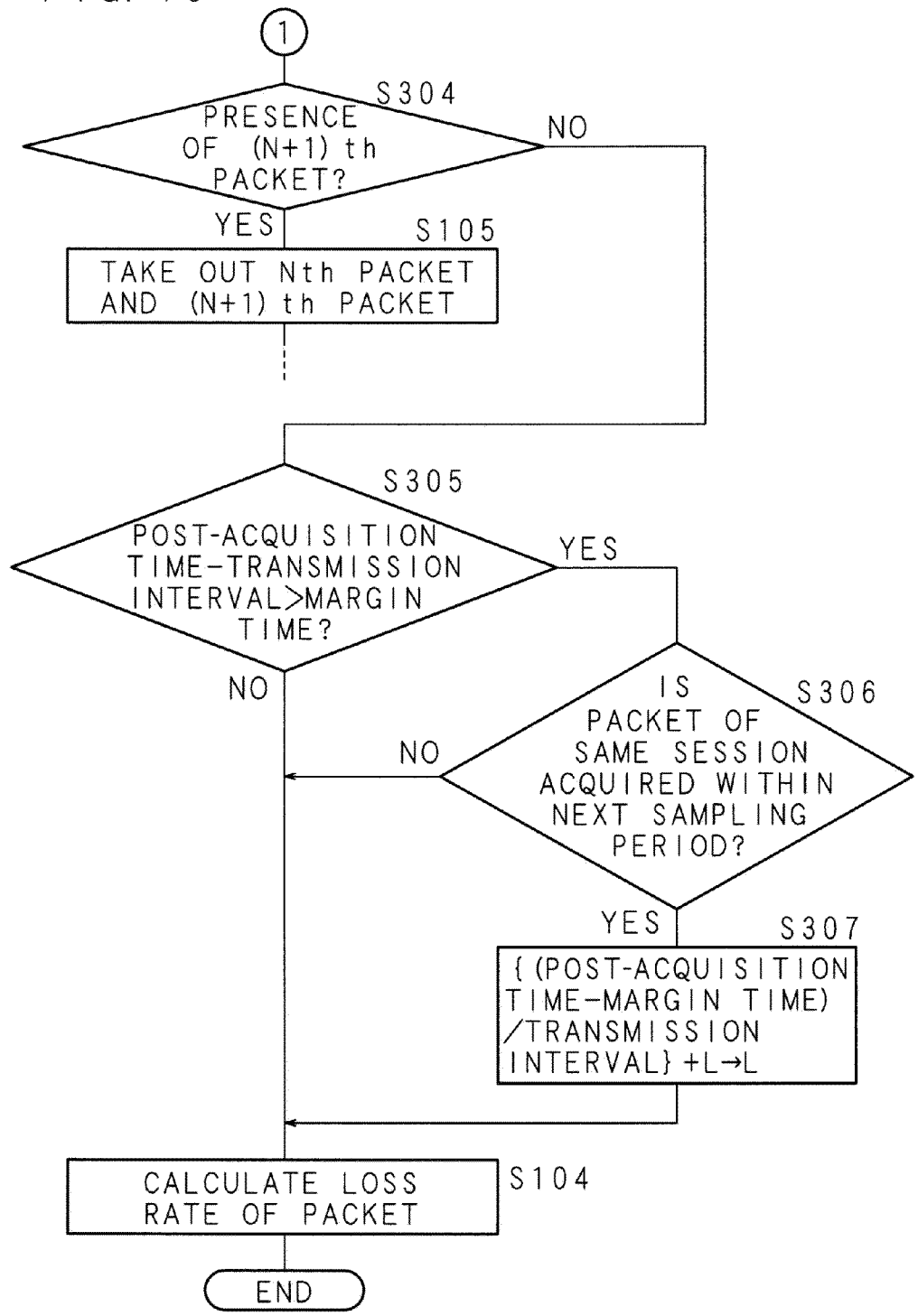
FIG. 10 is an operation chart illustrating one example of the third processing by the measuring apparatus according to the embodiment.

FIG. 9 and FIG. 10 are operation charts illustrating one example of the third processing by the measuring apparatus 1 according to the embodiment. Since the processing upon start in the third processing is similar to Steps S101 and S102 in the first processing, the first processing shall be referred to, and description thereof will be omitted. The measuring apparatus 1 initializes the counter by the control of the control unit 10 which executes the computer program 1000, and then determines whether or not a time obtained by subtracting the transmission interval of the packet from the pre-acquisition time after the sampling start time until acquiring the packet first is longer than the given margin time (S301).

If it is determined at Step S301 that the time obtained by subtracting the transmission interval from the pre-acquisition time is longer than the margin time (S301: YES), the measuring apparatus 1 determines whether or not the packet related to the same session as the session related to the packet used as the object of the quality measurement acquired within this sampling period is acquired within the last sampling period, by the control of the control unit 10 (S302). By Step S302, it is determined whether or not the session is established during this sampling period.

If it is determined at Step S302 that the packet related to the same session is acquired within the last sampling period, (S302: YES), it is determined that the session is continued from the last sampling period, and the measuring apparatus 1 adds to the lost packet counter L a value of a quotient calculated by dividing the time obtained by subtracting the given margin time from the pre-acquisition time by the transmission interval of the packet, by the control of the control unit 10 (S303). If the quotient calculated at Step S303 is not an integer, a numerical value after the decimal point is rounded down to an integer.

If it is determined at Step S301 that the time obtained by subtracting the transmission interval from the pre-acquisition time is shorter than the margin time (S301: NO), the processing at Steps S302 and S303 will not be performed.

If it is determined at Step S302 that the packet related to the same session is not acquired within the last sampling period, (S302: NO), it is determined that the session is established during this sampling period, so that the processing at Step S303 will not be performed.

The measuring apparatus 1 subsequently determines the presence/absence of the (N+1)th packet by the control of the control unit 10 (S304). Processing at Step S304 is processing similar to that at Step S103 in the first processing.

If it is determined at Step S304 that there is no (N+1)th packet (S304: NO), the measuring apparatus 1 determines whether or not a time obtained by subtracting the transmission interval of the packet from the post-acquisition time after acquiring the packet lastly until the sampling end time is longer than the given margin time, by the control of the control unit 10 (S305).

If it is determined at Step S305 that the time obtained by subtracting the transmission interval from the post-acquisition time is longer than the margin time (S305: YES), the measuring apparatus 1 determines whether or not the packet related to the same session as the session related to the packet used as the object of the quality measurement acquired within this sampling period is acquired within the next sampling period, by the control of the control unit 10 (S306). By Step S306, it is determined whether or not the session is completed during this sampling period.

If it is determined at Step S306 that the packet related to the same session is acquired within the next sampling period, (S306: YES), it is determined that the session is continued to the next sampling period, and the measuring apparatus 1 adds to the lost packet counter L a value of a quotient calculated by dividing the time obtained by subtracting the given margin time from the post-acquisition time by the transmission interval of the packet, by the control of the control unit 10 (S307). If the quotient calculated at Step S307 is not an integer, a numerical value after the decimal point is rounded down to an integer.

If it is determined at Step S305 that the time obtained by subtracting the transmission interval from the post-acquisition time is shorter than the margin time (S305: NO), the processing at Steps S306 and S307 will not be performed.

If it is determined at Step S306 that the packet related to the same session is not acquired within the next sampling period, (S306: NO), it is determined that the session is completed during this sampling period, so that the processing at Step S307 will not be performed.

The measuring apparatus 1 then executes the processing after Step S104 in the first processing.

If it is determined at Step S304 that there is the (N+1)th packet (S304: YES), the measuring apparatus 1 executes the processing after Step S105 in the first processing by the control of the control unit 10.

Figure 11:
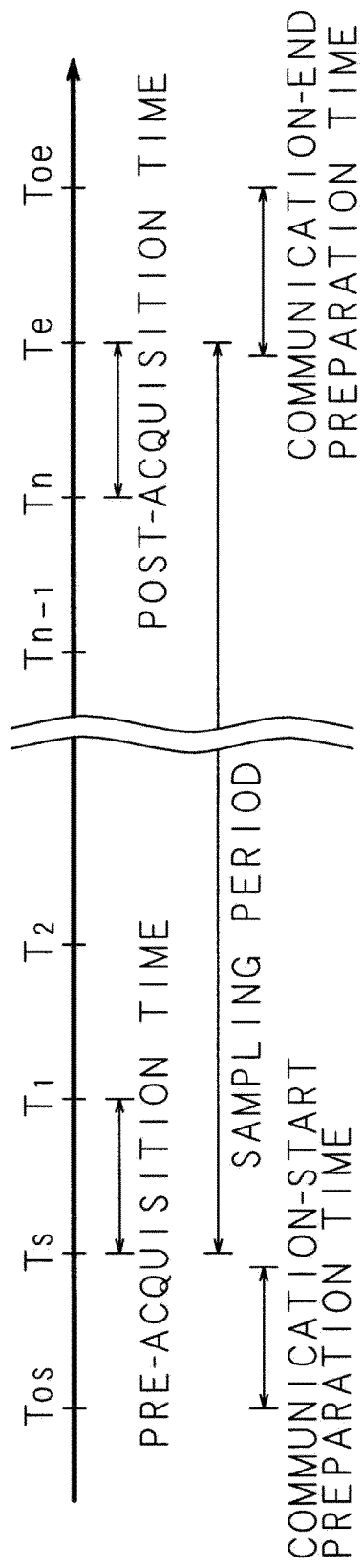
FIG. 11 is an explanatory view conceptually illustrating one example of a fourth processing by the measuring apparatus according to the embodiment.

FIG. 11 is an explanatory view conceptually illustrating one example of a fourth processing by the measuring apparatus 1 according to the embodiment. The fourth processing is an alternative processing of the third processing, and is processing of detecting the start and the end of the session on the basis of the signaling packets used for the start and the end of the session. It is to be noted that the signaling packet, such as a 200 OK response or the like to the Invite packet is transmitted and received between the communication apparatuses 103 and 103 for setting the session via the communication controller 2 upon start of the session, when taking an SIP protocol as an example, so that a preparation time for about 0.3 seconds will be required from a start time of the session to a transmission start time of the packet. Hence, a communication-start preparation time is previously set on the basis of a time from the start time of the session to the transmission start time of the packet, in the fourth processing. Similarly, a communication-end preparation time is also set previously on the basis of a time from a transmission end time of the packet to a session end time.

FIG. 11 illustrates a session start time Tos, a sampling start time Ts, an acquisition time T1 of the first packet within the sampling period, an acquisition time Tn of the last (the n-th) packet within the sampling period, a sampling end time Te, and a session end time Toe, in time series. In the fourth processing, an elapsed time from the session start time Tos to the sampling start time Ts is compared with the communication-start preparation time, and if the communication-start preparation time is longer than the elapsed time, it is determined that the transmission of the packet is started after the sampling start time Ts, during the sampling period. Incidentally, a case where the session start time Tos is later than the sampling start time Ts may also be considered, and in that case, since the elapsed time takes a negative value, it is determined that the communication-start preparation time is longer than the elapsed time.

In addition, an elapsed time from the sampling end time Te to the session end time Toe is compared with the communication-end preparation time, and if the communication-end preparation time is longer than the elapsed time, it is determined that the transmission of the packet is completed before the sampling end time Te, during the sampling period. Incidentally, a case where the sampling end time Te is later than the session end time Toe may also be considered, and in that case, since the elapsed time takes a negative value, it is determined that the communication preparation time is longer than the elapsed time.

Figure 12:
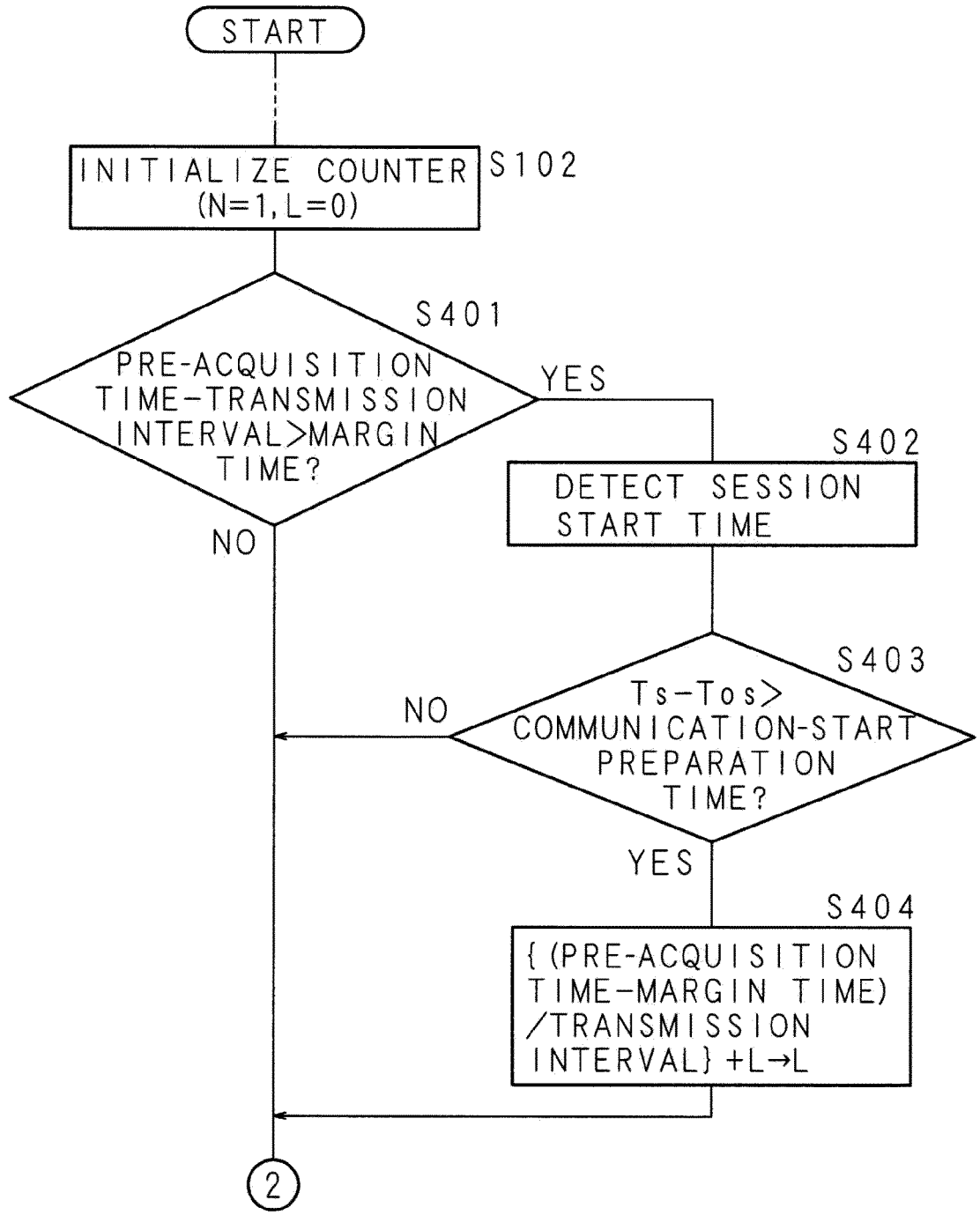
FIG. 12 is an operation chart illustrating one example of the forth processing by the measuring apparatus according to the embodiment.
Figure 13:
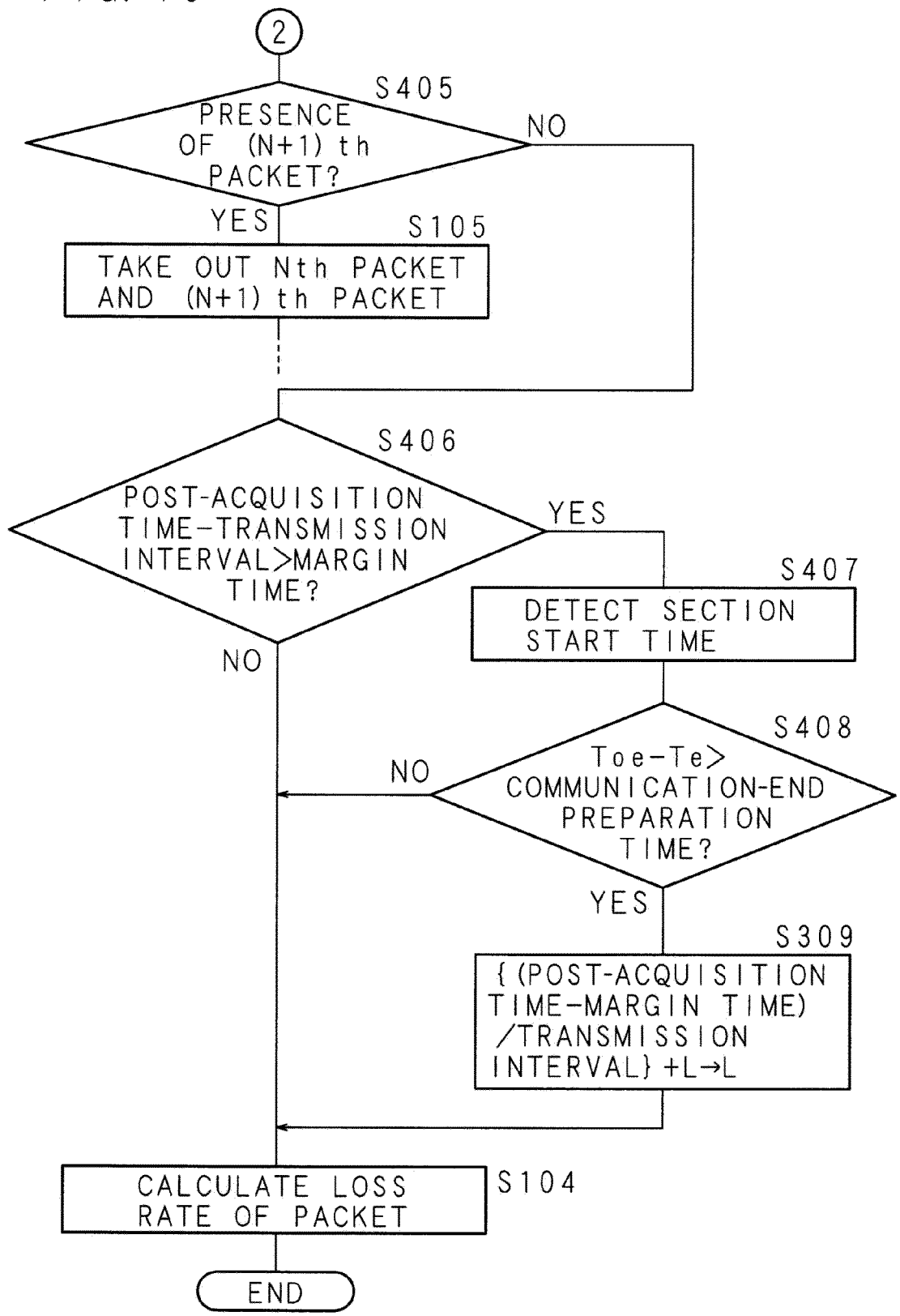
FIG. 13 is an operation chart illustrating one example of the forth processing by the measuring apparatus according to the embodiment.

FIG. 12 and FIG. 13 are operation charts illustrating one example of the fourth processing by the measuring apparatus 1 according to the embodiment. Since the processing upon start in the fourth processing is similar to Steps S101 and S102 in the first processing, the first processing shall be referred to, and description thereof will be omitted. The measuring apparatus 1 determines whether or not a time obtained by subtracting the transmission interval of the packet from the pre-acquisition time after the sampling start time until acquiring the packet first is longer than the given margin time, by the control of the control unit 10 which executes the computer program 1000 (S401).

If it is determined at Step S401 that the time obtained by subtracting the transmission interval from the pre-acquisition time is longer than the margin time (S401: YES), the measuring apparatus 1 detects the session start time by the control of the control unit 10 (S402). At Step 402, the session start time is detected on the basis of the communication with the communication controller 2 which controls the session. Specifically, the signaling packet transmitted and received via the communication controller 2 is acquired, and by confirming the acquired signaling packet, or by inquiring to the communication controller 2, the session start time may be detected.

The measuring apparatus 1 then compares the elapsed time (Ts-Tos) from the session start time to the sampling start time with the communication-start preparation time set previously, by the control of the control unit 10, and determines whether or not the elapsed time is longer than the communication-start preparation time (S403). By Step S403, it is determined whether or not the transmission of the packet is started before this sampling start.

If it is determined at Step S403 that the elapsed time is longer than the communication-start preparation time (S403: YES), it is determined that the transmission of the packet is started before the sampling start, the measuring apparatus 1 adds to the lost packet counter L a value of a quotient calculated by dividing the time obtained by subtracting the given margin time from the pre-acquisition time by the transmission interval of the packet, by the control of the control unit 10 (S404). If the quotient calculated at Step S404 is not an integer, a numerical value after the decimal point is rounded down to an integer.

If it is determined at Step S401 that the time obtained by subtracting the transmission interval from the pre-acquisition time is shorter than the margin time (S401: NO), the processing at Steps S402 to S404 will not be performed.

If it is determined at Step S403 that the elapsed time is shorter than the communication-start preparation time (S403: NO), it is determined that the transmission of the packet is started during this sampling period, so that the processing at Step S404 will not be performed.

The measuring apparatus 1 subsequently determines the presence/absence of the (N+1)th packet by the control of the control unit 10 (S405). Processing at Step S405 is processing similar to that at Step S103 in the first processing.

If it is determined at Step S405 that there is no (N+1)th packet (S405: NO), the measuring apparatus 1 determines whether or not a time obtained by subtracting the transmission interval of the packet from the post-acquisition time after acquiring the packet lastly until the sampling end time is longer than the given margin time, by the control of the control unit 10 (S406).

If it is determined at Step S406 that the time obtained by subtracting the transmission interval from the post-acquisition time is longer than the margin time (S406: YES), the measuring apparatus 1 detects the session end time by the control of the control unit 10 (S407). At Step 407, the session end time is detected on the basis of the communication with the communication controller 2 which controls the session. Specifically, the signaling packet transmitted and received via the communication controller 2 is acquired, and by confirming the acquired signaling packet, or by inquiring to the communication controller 2, the session end time may be detected.

The measuring apparatus 1 then compares the elapsed time (Toe-Te) from the sampling end time to the session end time with the communication-end preparation time set previously, by the control of the control unit 10, and determines whether or not the elapsed time is longer than the communication-end preparation time (S408). By Step S408, it is determined whether or not the transmission of the packet is continued after this sampling end.

If it is determined at Step S408 that the elapsed time is longer than the communication-end preparation time (S408: YES), it is determined that the transmission of the packet is continued after this sampling end, and the measuring apparatus 1 adds to the lost packet counter L a value of a quotient calculated by dividing the time obtained by subtracting the given margin time from the post-acquisition time by the transmission interval of the packet, by the control of the control unit 10 (S409). If the quotient calculated at Step S409 is not an integer, a numerical value after the decimal point is rounded down to an integer.

If it is determined at Step S406 that the time obtained by subtracting the transmission interval from the post-acquisition time is shorter than the margin time (S406: NO), the processing at Steps S407 to S409 will not be performed.

If it is determined at Step S408 that the elapsed time is shorter than the communication-end preparation time (S408: NO), it is determined that the transmission of the packet is completed during this sampling period, so that the processing at Step S409 will not be performed.

The measuring apparatus 1 then executes the processing after Step S104 in the first processing.

If it is determined at Step S405 that there is the (N+1)th packet (S405: YES), the measuring apparatus 1 executes the processing after Step S105 in the first processing by the control of the control unit 10.

Since the fourth processing may detect a transmission timing of the packet more accurately than the third processing, it is desirable to execute the fourth processing if the fourth processing is executable.

Although a mode of measuring the loss rate of packets as the communication quality is described in the embodiment, the embodiment is not limited to this, but may be expanded to various modes of measuring other communication quality, such as a delay time or the like.

In the embodiments, the number of packets used as an object of the measurement of the communication quality may be reduced, thus allowing the processing load required for the measurement of the communication quality to be reduced.

In the embodiments, if a post-acquisition time after acquiring the packet lastly is longer than a transmission interval of the packet even when the delay jitter of the packet is taken into consideration, it is determined that the packet which should be acquired after acquiring the packet lastly has been lost, so that the loss rate of packets measured as the communication quality is compensated, thereby allowing the communication quality to be measured accurately. Meanwhile, in the fifth aspect, similar processing is applied to the number of lost packets which should be acquired before acquiring the packet first, thus also allowing the communication quality to be measured accurately.

In the embodiments, if the packet related to the same session as the session related to the packet acquired within the sampling period is not acquired within the next sampling period, it is determined that the session is completed within this sampling period, so that the lost packets is not taken into consideration after acquiring the packet lastly, thus allowing the communication quality to be measured accurately. Meanwhile, in the seventh aspect, similar processing is applied to the number of lost packets which should be acquired before acquiring the packet first, thus also allowing the communication quality to be measured accurately.

In the embodiments, start of the session is grasped on the basis of the communication with other apparatus, such as a Session Initiation Protocol Server computer (SIP) and the like, a communication-start preparation time from the start of the session to the transmission start of the packet is also added, and thereby it is determined that the transmission of the packet is started within this sampling period, so that the packet lost before acquiring the packet first is not taken into consideration, thus allowing the communication quality to be measured accurately. In the ninth aspect, similar processing is applied to the number of lost packets which should be acquired after acquiring the packet lastly, thus also allowing the communication quality to be measured accurately.

In the embodiments, a reproducing time corresponding to, for example a memory size of a buffer memory for jitter absorption is set as a margin time, and thereby it may be determined that the packet lost is generated in a situation where a interruption of voice sound is generated, thus allowing the communication quality adapted to the practical use to be measured.

In the embodiments, a time corresponding to 90% of a delay time distribution is set as the margin time on the basis of, for example, actual measurement results in the past, thereby allowing precise communication quality to be measured on the statistical reliability.

The measuring method, the measuring apparatus, and the computer program in accordance with embodiments extract packets acquired within a given sampling period set intermittently; count the packets acquired within the sampling period; on the basis of a transmission interval of the packet, a time after a sampling start time until acquiring the packet first, and a given margin time, count the number of packets which should have been acquired before a packet acquired first within the sampling period as a first number of lost packets; on the basis of the transmission interval of the packet, the post-acquisition time after acquiring the packet lastly until a sampling end time, and the given margin time, count the number of packets which should have been acquired after a packet acquired lastly within the sampling period as a second number of lost packets; on the basis of a sequence indicated in the packet acquired first and a sequence indicated in the packet acquired lastly, and the number of acquired packets, count the number of packets which have not been able to be acquired between acquiring the packet first and acquiring the packet lastly within the sampling period as a third number of lost packets; and measure the communication quality on the basis of the number of acquired packets, and the first number of lost packets, the second number of lost packets, and the third number of lost packets.

According to this configuration, the number of packets used as the object of the measurement of the communication quality may be reduced in the embodiment, thus achieving an excellent effect such that the processing load required for the measurement of the communication quality, such as the loss rate of packets and the like may be reduced, and the like.

A detecting apparatus or the like in accordance with the embodiments counts the number of lost packets after acquiring the packet lastly on the basis of a quotient obtained by dividing a time which is obtained by subtracting the given margin time from the post-acquisition time, by the transmission interval of the packet, if a time obtained by subtracting the transmission interval of the packet from the post-acquisition time is longer than the given margin time.

According to this configuration, if the post-acquisition time after acquiring the packet lastly is longer than a transmission interval of the packet even when the delay jitter of the packet is taken into consideration, it is determined that the packet which should be acquired after acquiring the packet lastly has been lost, so that the loss rate of packets measured as the communication quality is compensated in the embodiment, thus achieving an excellent effect such that the communication quality may be accurately measured. Moreover, the detecting apparatus or the like in accordance with the fifth aspect achieves an excellent effect such that similar processing may be applied to the number of lost packets which should be acquired before acquiring the packet first to thereby measure the communication quality accurately or the like.

The detecting apparatus or the like in accordance with the embodiments determines whether or not the packet related to the same session as the session related to the packet acquired within the sampling period is acquired within the next sampling period, and if it is determined that the packet is not acquired, it measures the communication quality as there is no packet which should be acquired after acquiring the packet lastly.

According to this configuration, if it is determined that the packet related to the same session as the session related to the packet acquired within the sampling period is not acquired within the next sampling period, it is determined that the session is completed within the sampling period, so that the packets lost until acquiring the packet lastly will not be taken into consideration in the embodiment, thereby achieving an excellent effect such that the communication quality may be accurately measured. Moreover, the detecting apparatus or the like in accordance with the seventh aspect achieves an excellent effect such that similar processing may be applied to the number of lost packets which should be acquired before acquiring the packet first to also measure the communication quality accurately or the like.

The detecting apparatus or the like in accordance with the embodiments achieves an excellent effect such that a start time of the session is detected on the basis of the communication with other apparatus by the communication with other apparatus, such as the SIP server computer or the like which controls the session, an elapsed time from the start time of the session to the sampling start time is compared with the communication-start preparation time previously set on the basis of a time from the start of the session to the transmission start of the packet, and if it is determined that the communication-start preparation time is longer than the elapsed time, then it is determined that the packet transmission is started within the sampling period, thus allowing the communication quality to be accurately measured or the like. Moreover, the detecting apparatus or the like in accordance with the ninth aspect achieves an excellent effect such that similar processing may be applied to the number of lost packets which should be acquired after acquiring the packet lastly to also measure the communication quality accurately or the like.

The detecting apparatus or the like in accordance with embodiments may determine that the packet lost is generated in a situation where a interruption of voice sound is generated by setting a reproducing time corresponding to, for example a memory size of a buffer memory for jitter absorption as a margin time, thus achieving an excellent effect such that the communication quality adapted to an practical use may be accurately measured.

In the detecting apparatus or the like in accordance with the embodiments, a time corresponding to 90% of a delay time distribution may be set as the margin time on the basis of, for example, actual measurement actual results in the past, and in that case, it achieves an excellent effect such that the communication quality which may represent the statistical reliability may be measured or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

The invention claimed is:

1. A measuring method for acquiring packets being transmitted and received, in which a session, a sequence of the packets within the session, and a transmission interval of the packets are indicated, from a packet network, and measuring communication quality on the basis of the acquired packets, the method comprising:
   extracting packets acquired within one of given sampling periods, each sampling period set intermittently;
   counting the packets acquired within the sampling period;
   counting, on the basis of the transmission interval of the packet, a time after a sampling start time until acquiring the packet first, and a given margin time, a first number of lost packets which should have been acquired before a packet acquired first within the sampling period;

counting, on the basis of the transmission interval of the packet, a time after acquiring the packet lastly until a sampling end time, and the given margin time, a second number of lost packets which should have been acquired after a packet acquired lastly within the sampling period;

counting, on the basis of the sequence indicated in the packet acquired first and the sequence indicated in the packet acquired lastly, and a packet number of the acquired packets, a third number of lost packets which have not been able to be acquired between acquiring the packet first and acquiring the packet lastly within the sampling period; and calculating a loss rate of the packets on the basis of the packet number of the acquired packets, the first number of the lost packets, the second number of the lost packets, and the third number of the lost packets.

2. A measuring apparatus for acquiring packets being transmitted and received, in which a session, a sequence of the packets within the session, and a transmission interval of the packets are indicated, from a packet network, and measuring communication quality on the basis of the acquired packets, the apparatus comprising a processor coupled to a memory that performs operations as:

a part that extracts packets acquired within one of given sampling periods, each sampling period set intermittently;

a part that counts the packets acquired within the sampling period;

a first counting part that counts, on the basis of the transmission interval of the packet, a pre-acquisition time after a sampling start time until acquiring the packet first, and a given margin time, a first number of lost packets which should have been acquired before a packet acquired first within the sampling period;

a second counting part that counts, on the basis of the transmission interval of the packet, a post-acquisition time after acquiring the packet lastly until a sampling end time, and the given margin time, a second number of lost packets which should have been acquired after a packet acquired lastly within the sampling period;

a third counting part that counts, on the basis of the sequence indicated in the packet acquired first and the sequence indicated in the packet acquired lastly, and a packet number of the acquired packets, a third number of lost packets which have not been able to be acquired between acquiring the packet first and acquiring the packet lastly within the sampling period; and a part that calculates a loss rate of the packets on the basis of the packet number of the acquired packets, the first number of the lost packets, the second number of the lost packets, and the third number of the lost packets.

3. The measuring apparatus according to claim 2, wherein, when a time obtained by subtracting the transmission interval of the packet from the post-acquisition time is longer than the given margin time, the second counting part counts the second number of the lost packets on the basis of a quotient obtained by dividing a time which is obtained by subtracting the given margin time from the post-acquisition time, by the transmission interval of the packet.

4. The measuring apparatus according to claim 2, wherein, when a time obtained by subtracting the transmission interval of the packet from the pre-acquisition time is longer than the given margin time, the first counting part counts the first number of the lost packets on the basis of a quotient obtained by dividing a time which is obtained by subtracting the given margin time from the pre-acquisition time, by the transmission interval of the packet.

5. The measuring apparatus according to claim 2, wherein the processor performs further operations as:

a part that determines whether or not to acquire a packet related to the same session as the session related to the packet acquired within the sampling period, within a sampling period next to the sampling period; and a measuring part that, when it is determined that the packet related to the same session is not acquired, does not have the second number of the lost packets counted by the second counting part associate with the calculating.

6. The measuring apparatus according to claim 2, wherein the processor performs further operations as:

a part that determines whether or not to acquire a packet related to the same session as the session related to the packet acquired within the sampling period, within a sampling period before the sampling period; and a measuring part that, when it is determined that the packet related to the same session is not acquired, does not have the first number of the lost packets counted by the first counting part associate with the calculating.

7. The measuring apparatus according to claim 2, wherein the processor performs further operations as:

a part that detects an end time of the session on the basis of communications with other apparatus which controls the session;

a part that compares an elapsed time from the end time of the sampling to the end time of the session with a communication-end preparation time previously set on the basis of a time from a transmission end of the packet to an end of the session; and a measuring part, when it is determined that the communication-end preparation time is longer than the elapsed time, not having the second number of the lost packets counted by the second counting part associate with the calculating.

8. The measuring apparatus according to claim 2, wherein the processor performs further operations as:

a part that detects a start time of the session on the basis of communications with other apparatus which controls the session;

a part that compares an elapsed time from the start time of the session to the sampling start time with a communication-start preparation time previously set on the basis of a time from the start of the session to the transmission start of the packet; and a measuring part that, when it is determined that the communication-start preparation time is longer than the elapsed time, does not have the first number of the lost packets counted by the first counting part associated with the calculating.

9. The measuring apparatus according to claim 2, wherein the packet includes streaming data which reproduces at least one of an image and a voice, and the first counting part and the second counting part count using the margin time set on the basis of a reproducing time of the streaming data.

10. The measuring apparatus according to claim 2, wherein the first counting part and the second counting part count using the margin time set on the basis of an actual result value of delay jitter of the packet.

11. A non-transitory computer-readable recording medium which stores a computer-executable program for causing a computer which acquires packets being transmitted and received, in which a session, a sequence of the packets within the session, and a transmission interval of the packets are indicated, from a packet network to measure communication quality on the basis of the acquired packets, the program comprising instructions of causing the computer to execute:

extracting packets acquired within one of given sampling periods, each sampling period set intermittently;

counting the packets acquired within the sampling period;

counting, on the basis of the transmission interval of the packet, a time after a sampling start time until acquiring the packet first, and a given margin time, a first number of lost packets which should have been acquired before a packet acquired first within the sampling period;

counting, on the basis of the transmission interval of the packet, a time after acquiring the packet lastly until the sampling end time, and the given margin time, a second number of lost packets which should have been acquired after a packet acquired lastly within the sampling period;

counting, on the basis of the sequence indicated in the packet acquired first and the sequence indicated in the packet acquired lastly, and the number of acquired packets, a third number of lost packets which have not been able to be acquired between acquiring the packet first and acquiring the packet lastly within the sampling period; and calculating a loss rate of the packets on the basis of the packet number of the acquired packets, the first number of the lost packets, the second number of the lost packets, and the third number of the lost packets.

* * * * *